United States Patent [19]

Goldsmith

[11] Patent Number: 4,536,418
[45] Date of Patent: Aug. 20, 1985

[54] METHOD FOR TREATING POTASH WITH ANTICAKING AGENT

[75] Inventor: Elmar L. Goldsmith, Regina, Canada

[73] Assignee: PPG Industries Canada, Ltd., Regina, Canada

[21] Appl. No.: 370,767

[22] Filed: Apr. 22, 1982

[51] Int. Cl.³ .............................................. B05D 7/00
[52] U.S. Cl. .................................. 427/213; 427/215; 427/299; 427/345; 427/346; 427/348; 427/398.5
[58] Field of Search ............... 427/213, 215, 345, 346, 427/299, 348, 398.5

[56] References Cited

U.S. PATENT DOCUMENTS

| | | | |
|---|---|---|---|
| 1,140,995 | 5/1915 | Miller | 252/383 |
| 2,056,540 | 10/1936 | Sigura | 23/239 |
| 2,112,175 | 11/1963 | Schultze et al. | 23/89 |
| 2,162,690 | 6/1939 | Anderson | 23/242 |
| 3,117,020 | 1/1964 | Fabris et al. | 427/213 |
| 3,186,828 | 6/1965 | Baarson et al. | 71/64 |
| 3,305,491 | 2/1967 | Oster | 252/384 |
| 3,393,973 | 7/1968 | Almy | 23/89 |
| 3,711,254 | 1/1973 | McGowan et al. | 23/313 |
| 3,926,841 | 12/1975 | Habasko | 252/383 |
| 4,192,756 | 3/1980 | Mondshine | 252/383 |
| 4,219,589 | 8/1980 | Niks et al. | 427/213 |

Primary Examiner—Norman Morgenstern
Assistant Examiner—Janyce A. Bell
Attorney, Agent, or Firm—Irwin M. Stein

[57] ABSTRACT

Anti-caking agent is thoroughly distributed upon particulate hygroscopic materials, e.g., particulate inorganic salts such as potassium chloride and sodium chloride, by contacting an agitated stream of the particulate material with an aqueous dispersion of anticaking agent and then passing the treated material through a fluid bed of the treated particulate material. The pretreated particulate hygroscopic material is typically warm, i.e., has a temperature above 25° C., and is cooled in the fluid bed which is fluidized with dehumidified, fluidizing gas having a temperature lower than the treated particulate hygroscopic material entering the bed. Cooled particulate hygroscopic material having a coating of anticaking agent distributed substantially uniformly over the surface of the particles and having a water content substantially the same as the pretreated warm particulate material is removed from the fluid bed.

18 Claims, 1 Drawing Figure

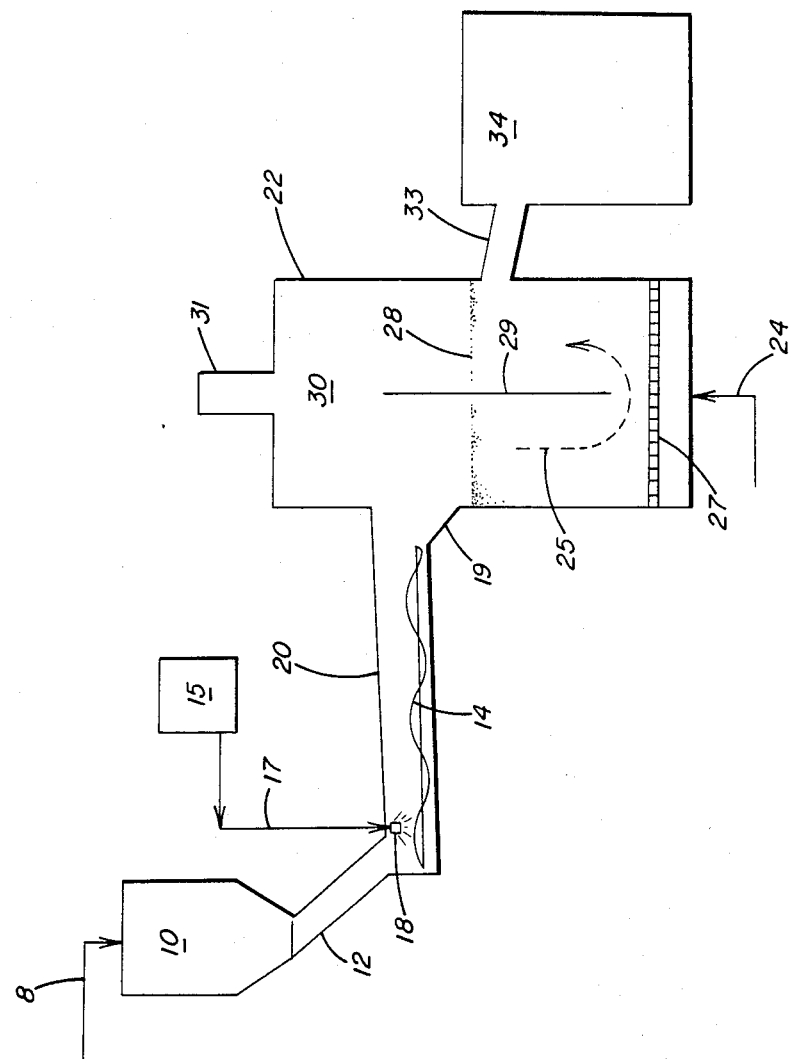

METHOD FOR TREATING POTASH WITH ANTICAKING AGENT

DESCRIPTION OF THE INVENTION

The present invention relates to a method of distributing anitcaking agent upon the surface of particulate materials, especially hygroscopic materials that tend to coalesce and cake during storage owing to the effects of moisture, temperature, and/or pressure. In particular, the invention relates to a novel method for distributing anticaking agent substantially uniformly over the surface of hygroscopic particulate inorganic salts and simultaneously cooling such treated salts to produce a product which has a reduced tendency to cake during storage.

Caking during storage of particulate chemical fertilizers, e.g., inorganic salts, has long been a troublesome and annoying problem. Fertilizer materials which have agglomerated are not amenable to conventional bulk storage and handling techniques and, after storage, cannot be spread with conventional mechanical distribution devices. To reduce this tendency toward caking, many of the present-day fertilizers are produced in granulated form and treated with anticaking agents. Such coalescence and the resulting agglomeration is believed to be caused by adsorption of moisture on the surfaces of the hygroscopic particles. This absorbed moisture dissolves some of the product and forms a coating over the surface of each particle. Subsequent recrystallization of the product, e.g., inorganic salt, from the coating, which can be caused by drying of the particles, changes in humidity to which the particles are subjected and the like, can result in the formation of crystal bridges of the product between adjacent particles. When such particles become so linked, the material lumps and has a reduced flowability. The finer the size of the hygroscopic particles, the greater the tendency for the particles to coalesce.

One of the hitherto known methods for applying anticaking agents to the surface of particulate hygroscopic materials is to spray an aqueous dispersion (suspension, emulsion or solution) of anticaking agent onto the particulate material as it is agitated. For example, U.S. Pat. No. 3,186,828 describes the spraying of a 30–70 percent mineral oil solution of an aliphatic primary amine, e.g., fatty amine, onto a particulate material. U.S. Pat. No. 3,305,491 adds a catio-anio composition comprising an acid mixture of cationic fatty amines and fatty acids to particulate fertilizers and salts to prevent caking thereof.

The presence of an anticaking agent e.g., aliphatic amine, deposited on the surface of a hygroscopic granule is believed to prevent caking of the material by providing a hydrophobic film on the surface of the particle which curtails adsorption of water by the granule. Additionally, the anticaking agent may cause modification of the crystal habit of the crystals forming the bridges between the granules so that such crystal bridges are of a weaker crystalline form. Such weaker bonds are more easily broken and cementitious-type caking is thereby reduced.

Unfortunately, it has been found that the conventional technique of spraying anticaking agent upon an agitated mass of hygroscopic particles does not produce a treated product in which the anticaking agent is distributed substantially uniformly over the surface of the particles. This results in some particles containing little or no anticaking agent. These poorly treated particles tend to coalesce and permit caking of the mass of stored product.

It has now been discovered that anticaking agent can be distributed substantially uniformly upon the surface of particulate hygroscopic materials by a relatively simple and facile method. This method comprises using, in combination, the steps of treating an agitated stream of the particles with anticaking agent followed by passing directly the thus treated material to a fliud bed comprising such treated material. It has been found that the distribution and coverage of anticaking agent on particulate hygroscopic materials treated in this manner is substantially more uniform and complete than when the application and anticaking agent is performed either by spraying onto an agitated mass of the material or by spraying the material within a fluidized bed thereof. In addition, since the particulate material to be treated can be relatively hot in certain embodiments, use of the aforementioned two-step method permits cooling of the treated material to near ambient temperatures.

The treated particulate material, e.g., alkali metal salt, produced by the process of the present invention is a substantially dry, particulate material having a substantially uniform, well distributed coating of anticaking agent on the surfaces thereof. By substantially dry is meant that the material is free-flowing. To be free-flowing, particulate material commonly contains less than 5, preferably less than 2.5, e.g., less than 1, weight percent water.

BRIEF DESCRIPTION OF THE DRAWING

The present invention will be better understood by reference to the accompanying FIGURE, which is a diagrammatic illustration of the twostep process described herein for treating hygroscopic particulate material with an anticaking agent.

DETAILED DESCRIPTION OF THE INVENTION

The method of the present invention is applicable to the treatment of particulate hygroscopic materials such as fertilizers and salts, e.g., inorganic salts. Examples of such material include particulate sodium chloride, potassium chloride (muriate of potash), ammonium chloride and potassium sulfate. For convenience, the aforesaid materials will be referred to hereinafter as particulate or granular salts.

Particulate salt particles treated in accordance with the process of the present invention will typically range in particle size (average diameter—assuming a spherical particle) from about 0.1 mm to about 3.4 mm.

The particulate salt materials treated in accordance with the present invention are hygroscopic, i.e., they absorb water from the atmosphere or other sources of water to the degree that the surfaces of the particles become sufficiently moist so that adjacent particles coalesce and bond together. Such coalescence results in the caking of a stored mass of the material to the extent that the material is not readily flowable and is not amenable to conventional bulk handling techniques.

The process of the present invention is particularly applicable to industrially produced inorganic salts such as potassium chloride and sodium chloride. Such salts are conventionally mined from ore deposits by shaft and pillar techniques or by solution mining. A solution of the salt is concentrated, e.g., in an evaporation circuit, which comonly comprises multiple evaporation effects, and the salt crystallized from the concentrated solution, e.g., in a crystallization zone which is typically composed of multiple crystallizer stages. The crystallized salt typically has a temperature greater than 25° C., e.g., from about 30° C. to about 40° C. The crystallized salt is then commonly separated from its mother liquor, e.g., by filtration, centrifugation, etc.

The wet cake of salt crystals produced by removing entraining mother liquor from the crystallized salts is then forwarded to drying means e.g., a rotary or fluid bed dryer, in which most of the water content of the cake is removed. The hot dried salt particles are sized and then treated with anticaking agent and forwarded to storage. Very fine particles of such salts, e.g., the fines, are commonly compacted into a sheet of uniform thickness and the compacted sheet granulated to produce a particulate material more suitable for handling and sale.

Referring now to the drawing, there is shown hopper 10 for storage of hot particulate hygroscopic material, e.g., inorganic salt such as sodium chloride or potassium chloride, from the drying and sizing operations heretofore discussed. The particulate material is charged to hopper 10 by means of feed line 8. From the hopper, it is forwarded by chute 12 onto feeder 20 equipped with means for agitating a stream of the particulate material as it is being forwarded to fluid bed cooler 22. Feeder 20 is preferably equipped with a conveying screw 14, more preferably a mixing screw, for agitating the particulate material. Screw 14 is preferably attached mechanically to a variable speed drive to insure proper distribution of the anticaking agent at various product throughputs. However, other means for performing such agitation as the particulate material flows as a moving stream through feeder 20 can be used. Examples include: pneumatic conveyors, vibrating conveyors, and an inclined apron conveyor equipped with an air fluidizing compartment.

An aqueous dispersion of anticaking agent is stored in tank 15 and conveyed by means of flow line 17 to the space above the moving bed of particulate material in feeder 20. The aqueous dispersion of anticaking agent can be an emulsion, suspension, or solution of such agent in an aqueous media. The physical form of the aqueous dispersion of anticaking agent will depend upon the solubility of the agent in the water medium. The temperature of the aqueous dispersion will typically be at ambient temperature or at temperatures consistent with the flowability of viscous solutions such as that of water soluble aliphatic amines, e.g., temperatures up to about 60° C.

The aqueous dispersion of anticaking agent is applied to the surface of the agitated moving stream of particulate material within feeder 20 by any convenient technique, e.g., spray nozzle 18. Preferably the spraying of the anticaking aqueous dispersion is performed near the front end of feeder 20, i.e., the end closest to feed hopper 10 to achieve an even distribution over and intimate contact of the anticaking agent with the particulate material. Typically, the anticaking agent is applied from at least 4 to 8 feet, e.g., 6 to 8 feet, from the discharge end of feeder 20. This permits initial distribution of the anticaking agent upon the surface of the agitated particulate material. Also contemplated are a series of atomizing nozzles along the length of the feeder 20 to produce as even a distribution of anticaking agent as possible on the surfaces of the particles.

Anticaking agent treated particles are forwarded by means of inclined chute 19 from feeder 20 into fluid bed 22. Preferably, the fluid bed is divided into two compartments by baffle means 29 so that the treated particles travel from the inlet side of fluid bed 22 down, around baffle 29 and up into the discharge side of fluid bed 22. The path of the treated particles through fluid bed 22 is indicated by dotted line 25. The treated particles are removed from fluid bed cooler 22 by means of chute 33 and forwarded to storage silo 34.

Fluidizing gas is introduced into the fluid bed by means of inlet line 24. The fluidizing gas passes through distribution plate 27 containing a plurality of orifices through which the fluidizing gas passes with sufficient velocity to fluidize the bed. The height of the bed of treated particulate material is indicated by line 28. The feed rate of treated particles into the fluid bed and the discharge rate of cooled particles from the fluid bed should be so regulated that the height of the fluidized bed does not extend above the bottom of inclined chute 19. Fluidizing gas flows upwardly through the bed and into disengaging space 30 and is removed from the cooler by means of conduit 31. The exiting fluidizing gas is forwarded to gas-solid separation means, such as a dust collector, before the gas is discharged to the atmosphere.

The concentration of anticaking agent in the aqueous dispersion will depend on the amount of anticaking agent that it is desired be placed on the hygroscopic particulate material. Typically, an effective amount of anticaking agent, e.g., an amount sufficient to inhibit cementitious caking of the particulate material, is used, i.e., an anticaking amount. Commonly salts such as potassium chloride are contacted with amine anticaking agents at an application rate of between about 0.1 or 0.2 and about 1.0 pounds per ton of salt. This rate of application is appropriate for other hygroscopic particulate materials also, i.e., an application rate of from about 0.005 or 0.01 to about 0.05 weight percent.

Any fluidizing gas which does not interact chemically with the particulate material present in the fluid bed cooler can be used. Typically the fluidizing gas is air, nitrogen, or other commonly used fluidizing gas. In addition, the fluidizing gas may have a temperature substantially lower than the particulate salt treated so that the treated particles are cooled to the temperature of the fluidizing gas, e.g., near ambient temperature. The temperature of the fluidizing gas will typically be at ambient temperature, e.g., between about 15° C. and about 30° C., depending on the time of the year. Further, in a preferred embodiment, the relative humidity of the fluidizing gas is sufficiently low so that the water added to the particulate material with the anticaking agent is simultaneously removed from the treated particles during cooling. Otherwise, a further drying step is required. If necessary, the fluidizing gas can be dehumidified by conventional means in order to lower the relative humidity of the fluidizing gas in order to produce a cooled, dried particulate material, e.g., inorganic salt, which has been treated uniformly with anticaking agent. Fluidizing gas is introduced into fluid bed 22 in amounts sufficient to produce appropriate fluidization of the particulate material therein. The amount of gas is controlled to avoid carry over of particulate material with the exiting fluidizing gas and also to prevent channeling of the fluidizing gas through the bed.

While not wishing to be bound by any particular theory, it is believed from the evidence at hand that the combination of agitation in feeder 20 and agitation in fluid bed cooler 22 produces a particulate material which is more uniformly (both in amount and surface area) covered with anticaking agent, i.e., a more homogeneous distribution of anticaking agent on all of the particles is achieved. The agitating means, e.g., mixing screw, in feeder 20 provides an initial distribution of anticaking agent on the particulate material and begins the dewatering process. Alone, this distribution remains spotty on the individual particles. The fluid bed provides additional spreading of the anticaking agent over the particles, continues the dewatering process and provides product cooling. The water content of the cooled, particulate material which has been treated with anticaking agent is substantially the same as the pretreated warm particulate material charged to feeder 20 from hopper 10.

Any of the anticaking agents commonly used to treat hygroscopic particulate materials (or which are found useful in the future) that are applied with an aqueous carrier can be used in the present process. Examples of such anticaking agents include: glycerin, mineral oil, animal or vegetable oils, amine salts, e.g., a salt of a fatty acid amine of 10 or more carbon atoms with either an inorganic acid or an organic acid of 6 or less carbon atoms, such as dodecylamine hydrochloride, and octodecylamine acetate, mixtures of such amine salts, such as ARMAC ®-T amine acetate salt, which is a mixture of hexadecylamine acetate and octadecylamine acetate, aliphatic amines of the formula $RR_1R_2N$, wherein R is an aliphatic hydrocarbon radical (alkyl group) containing from 8–22 carbon atoms and $R_1$ and $R_2$ are each either hydrogen or an alkyl group containing from 1–22 carbon atoms, alkaline earth or multivalent metal salts of lignosulfonate, tricalcium phosphate, sodium silico aluminate and yellow prussiate of soda.

The process of the present process is more particularly described in the following examples which are intended as illustrative only. Since numerous modifications and variations therein will be apparent to those skilled in the art. In the examples, equipment such as that depicted in the accompanying FIGURE was used.

EXAMPLE 1

Particulate potash having a size range of −8, +14 Tyler mesh was conveyed by means of a mixing screw of the cut and fold type at a rate of about 30 tons per hour from a storage hopper to a fluid bed cooler. Anticaking agent was sprayed at an application rate of about 0.01 weight percent with a flood jet spray nozzle onto the moving stream of particulate potash as it was conveyed by the mixing screw. The spray nozzle was located about 8–8½ feet from the discharge end of the mixing screw. The anticaking agent used was Armac ® T amine acetate salt, which was applied as an 8 weight percent aqueous solution. Rhodamine B dye, a basic red fluorescent dye, was also added to the aqueous solution of Armac ® T amine acetate salt to aid in making a visual examination of the coverage of the potash particles with the anticaking agent.

Samples of the treated product were collected from the mixing screw discharge. The coverage with dye (coresponding to anticaking agent coverage) was examined visually and then by quantitative dye analysis. It was found that while virtually all of the potash particles had dye on them, the coverage of the dye over the surface of the particles was very spotty. Thus, large portions of each particle were essentially untreated.

EXAMPLE 2

The anticaking agent-treated particulate potash of Example 1 was discharged from the mixing screw into a fluid bed cooler having an inlet side and a discharge side. Samples of the treated potash were collected from the discharge of the fluidizing bed and examined in the same manner as in Example 1. It was found that coverage of the potash particles with anticaking agent (dye) was substantially uniform in both the amount of anticaking agent on each particle and the thoroughness of the surface coating, i.e., the anticaking agent was substantially uniformly (evenly) spread over the surfaces of the particles.

EXAMPLE 3

Particulate potash having a size range of −8, +14 Tyler mesh was conveyed in the manner and rate described in Example 1 into the fluid bed cooler of Example 2. Anticaking agent (as prepared in Example 1) was sprayed through a flood jet nozzle located at about the center of the potash bed on the inlet side of the fluid bed cooler at the same rate as Example 1. Samples of the treated potash were collected from the discharge of the fluid bed and examined in the same manner as in Example 1. It was found that the level of anticaking agent treatment varied greatly from particle to particle. While some particles were treated with anticaking agent levels much higher than the average, others had very little or no treatment. The surfaces of the particles containing an adequate level of treatment were covered substantially uniformly.

Although the present process has been described with reference to specific details of certain embodiments thereof, it is not intended that such details should be regarded as limitations upon the scope of the invention except as and to the extent that they are included in the accompanying claims.

What is claimed is:

1. A method for uniformly distributing liquid anticaking agent onto the surface of particulate, hygroscopic material, which comprises applying an anticaking amount of an aqueous dispersion of anticaking agent to a stream of said particulate material while agitating said material, said agitation providing an initial distribution of anticaking agent on the particulate material, passing directly particulate material treated with anticaking agent through a fluidized bed of said treated particulate material, and removing from the fluidized bed particulate hygroscopic material having anticaking agent distributed substantially uniformly over the surface of the particles of the particulate material.

2. The method of claim 1 wherein the particulate, hygroscopic material is selected from the group consisting of sodium chloride, potassium chloride, potassium sulfate and ammonium chloride.

3. The method of claims 1 or 2 wherein the anticaking agent is applied at a rate of between about 0.1 and about 1.0 pounds per ton of particulate material.

4. The method of claims 1 or 2 wherein the fluid bed has an inlet side and a discharge side and said inlet and discharge sides are separated by baffle means.

5. The method of claims 1 or 2 wherein the fluidizing gas has a relative humidity sufficiently low such that substantially all of the water added with the anticaking agent is removed from the treated particulate material.

6. A method for uniformly distributing liquid anticaking agent onto the surface of particulate, hygroscopic inorganic salt, which comprises applying an anticaking amount of an aqueous dispersion of anticaking agent to a stream of said particulate salt while mixing said salt, thereby to provide an initial distribution of anticaking agent on the particulate material, forwarding said treated salt directly to a fluidized bed of anticaking agent-treated particulate salt, fluidizing said bed of particulate salt with fluidizing gas of low relative humidity, passing said treated salt through said fluidized bed, and removing from the fluidized bed particulate, inorganic salt having anticaking agent distributed substantially uniformly over the surface of the particles of said inorganic salt and a water content substantially the same as the pretreated particulate salt.

7. The method of claim 6 wherein the inorganic salt is potassium chloride.

8. The method of claims 6 or 7 wherein the pretreated particulate salt has a temperature greater than about 25° C., and the fluidizing gas has a temperature lower than the pretreated particulate salt, thereby to cool the treated particulate salt.

9. The method of claims 6 or 7 wherein the fluidized bed has an inlet side and a discharge side and said inlet and discharge sides are separated by baffle means.

10. The method of claim 8 wherein the fluidized bed has an inlet side and a discharge side and said inlet and discharge sides are separated by baffle means.

11. The method of claims 6 or 7 wherein the anticaking agent is applied at a rate of between about 0.2 and about 1.0 pounds per ton of particulate inorganic salt.

12. A method for uniformly distributing liquid anticaking agent onto the surface of particulate hygroscopic material, which comprises spraying an anticaking amount of an aqueous dispersion of anticaking agent onto a stream of said particulate material while said stream of material is being conveyed by a mixing screw, passing directly particulate material treated with anticaking agent through a fluidized bed of said treated particulate material, and removing from the fluidized bed particulate hygroscopic material having anticaking agent distributed substantially uniformly over the surface of the particles of the particulate material.

13. The method of claim 12 wherein the particulate hygroscopic material is selected from the group consisting of sodium chloride, potassium chloride, potassium sulfate and ammonium chloride.

14. The method of claim 13 wherein the anticaking agent is applied to the particulate material at least 4 to 8 feet from the discharge end of the mixing screw.

15. The method of claim 13 wherein the anticaking agent is applied at a rate of between about 0.1 and about 1.0 pounds per ton of particulate material.

16. The method of claim 13 wherein the fluid bed has an inlet side and a discharge side and said inlet and discharge sides are separated by baffle means.

17. The method of claim 13 wherein the fluidizing gas has a relative humidity sufficiently low such that substantially all of the water added with the anticaking agent is removed from the treated particulate material.

18. The method of claim 12 wherein the particulate hygroscopic material is an inorganic salt.

* * * * *